United States Patent [19]

Giughèse

[11] Patent Number: 4,605,345

[45] Date of Patent: Aug. 12, 1986

[54] DRILLING APPARATUS WITH WALL-COVERING PROTECTION

[76] Inventor: Michel Giughèse, 51, rue de la Balme, Lyon, France

[21] Appl. No.: 614,437

[22] Filed: May 25, 1984

[30] Foreign Application Priority Data

May 25, 1983 [FR] France ............... 83 08952

[51] Int. Cl.⁴ .............................. B23B 51/00
[52] U.S. Cl. ................... 408/95; 408/72 R; 408/97; 408/241 B
[58] Field of Search ............ 408/72 R, 73, 95, 97, 408/99, 110, 113, 114, 117, 118, 119, 241 B, 241 G, 714, 81, 80, 202

[56] References Cited

U.S. PATENT DOCUMENTS 2,296,087  9/1942  Burns, Jr. ............... 408/81
3,192,801  7/1965  Gingras ................... 408/97
3,620,634  11/1971  Sullivan ................. 408/95
4,036,674  7/1977  Labenz .................... 408/99

FOREIGN PATENT DOCUMENTS 424054  1/1926  Fed. Rep. of Germany ........ 408/72

Primary Examiner—Gil Weidenfeld
Assistant Examiner—Daniel W. Howell
Attorney, Agent, or Firm—Karl F. Ross; Herbert Dubno

[57] ABSTRACT

A protective device for a fabric or other soft wall covering upon the drilling of a hole therethrough into a support wall behind the covering has a sleeve which closely surrounds the drill bit, a spring braced against the sleeve and a roller bearing to permit immobilization of the sleeve as the drill bit rotates and is axially displaced in the latter. The sleeve has a circular array of pins projecting from its face turned away from the chuck and adapted to penetrate the wall covering. A light supplementary spring can be provided on this side of the sleeve as well to compress the wall covering.

10 Claims, 5 Drawing Figures

DRILLING APPARATUS WITH WALL-COVERING PROTECTION

FIELD OF THE INVENTION

My present invention relates to an apparatus for drilling a hole in the wall without detriment, apart from the formation of the hole, to wall covering of a fabric, fibrous, foam or soft type which may be excessively damaged by a drilling operation, e.g. by the seizure, entwinement or tearing of fabrics from the wall covering, a support or cushion, or a backing layer and any intervening cement or adhesive layer.

BACKGROUND OF THE INVENTION

While the drilling of holes in a wall structure, e.g. of masonry or plastic, is not particularly difficult utilizing a conventional drill bit and where necessary, the various commercially available guides or the like for ensuring that the drill bit will not move excessively from the site of the hole, there are, however, cases in which the drilling of such holes poses a significant problem. One such case is where the drilling must be effected through a wall covering having a fabric or fibrous construction and or a bulky or pad construction.

Such wall coverings are utilized from time to time for esthetic, sound-damping and artistic effects and include fabric wall coverings, fabrics applied to fabric backings, wall coverings with fabric backings and various blanket and carpeting fabrics which may be cemented or otherwise bonded to foam or other materials. Duffle, flannels and like materials have been utilized or proposed as either the outer or the backing layers in such comparatively thick wall coverings.

When attempts are made to drill into the underlying wall through such materials utilizing conventional drill bits with or without guides of the type hitherto provided, problems are encountered not only because there is a tendency to damage the outer fabric but also because of the tendency for the fibers of the underlying layer to entwine around a bit and to be pulled from the fabric and/or a support or cushion. This can cause degradation of the wall covering over substantial areas and damage which encompasses regions far larger than the particular hole.

The problem can be overcome in part by cutting the wall covering as part of the drilling process or prior to the drilling process utilizing special cutting tools which can be provided for this purpose. Not only is such a cutting operation difficult to carry out but it is not always successful since if even a single fiber from a funnellike backing layer remains to entwine around the drill, serious degradation can occur. An alternative approach, of course, is to cut through the fabric and its backing with a much larger diameter than the hole which is to be ultimately drilled, e.g. to form a passage about three times larger than the hole to ensure that there will be no residual fibers or threads which can be pulled by the drill. This, of course, damages the esthetic effect because, even if a small hole is to be made, a larger piece of wall covering which may have to be cut out generally will render the operation unsightly.

OBJECTS OF THE INVENTION

It is the principal object of the present invention, therefore, to overcome these drawbacks and provide an improved apparatus for drilling a hole in a wall provided with such a sensitive covering without special preparation of the cutting material and without the need to form a larger opening in the wall covering than is required for the hole.

Another object of this invention is to provide an improved apparatus for drilling a hole in a wall having such a wall covering which will avoid damage to the wall covering around the hole which is to be ultimately formed.

SUMMARY OF THE INVENTION

These objects and others, which will become apparent hereinafter, are attained, in accordance with the present invention, by providing a protective head on the drill bit which comprises a cylindrical sleeve having at its center a cylindrical bore of a diameter only slightly greater than the diameter of the shank of the bit and provided on its face turned forwardly toward the wall, with a multiplicity of uniform distributive points or pins defining at least one circle coaxial with the bore and disposed between this bore and the periphery of a sleeve, a spring seated against the opposite face of the sleeve and compressible upon the advance of the chuck and the drill bit through the sleeve for maintaining pressure upon the sleeve and the points or pins which pierce the fabric and backing or cushioning layers around the region at which the hole is to be drilled, and at least one bearing permitting relative rotation of the drill bit and the sleeve so that the latter can be retained against rotation while the drilling operation is carried out. The points or pins thus pierce the fabric without significant damage and because the sleeve does not rotate, serve to prevent threads from entwining around the drill and from being pulled by the bit.

According to a feature of the invention, and in one embodiment thereof, the bearing includes an inner race which is rotatable with the bit and is entrained therewith by reason of a cylindrical rubber member hugging the tool bit. The outer race of the bearing can be force-fitted into a cylindrical recess in the member in which it is ensconced. When this member is the sleeve, the spring can rotate with the tool body whereas when the spring is seated against the sleeve and braces against an outer member surrounding the bearing, this outer member proximal to the chuck will remain nonrotatable with the sleeve and the bit rotates within the spring and is surrounded thereby.

In another case, the cylindrical recess surrounds a hole traversed by the tool bit and the spring can be a coil spring compressed between the other face of the sleeve and the end of the chuck or this nonrotatable member receiving the bearing.

In the latter embodiment both the sleeve and the cylindrical outer member form seats for the opposite ends of the spring and also fix the spring against radial displacement which might bring the spring into some detrimental engagement with the bit.

Advantageously, the cylindrical sleeve comprises at least twelve relatively short points or pins distributed uniformly in at least one circle with the pins being angularly equispaced from one another about the bore through which the drill bit passes.

Naturally, the pins or points should be as small as possible in diameter as to be able to anchor the sleeve against rotation while nevertheless leaving the wall covering free from noticeable pierce markings resulting from penetration by the pins.

Advantageously, a supplemental spring can be provided at the face of the sleeve turned toward the wall covering and this light spring can be compressed elastically to improve the purchase of the sleeve against the wall covering. Upon retraction of the drill and withdrawal of the pins, this spring serves to hold the yieldable wall covering in place and thus improves the efficiency and clearness of the separation. A circular groove can be provided in the sleeve around the array of pins in order to receive the supplemental spring.

The bore through the sleeve can have a diameter about 0.1 mm above that of the drill bit to be received thereon or a somewhat larger diameter if desired and the cylindrical sleeve is preferably composed of a polyamide.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
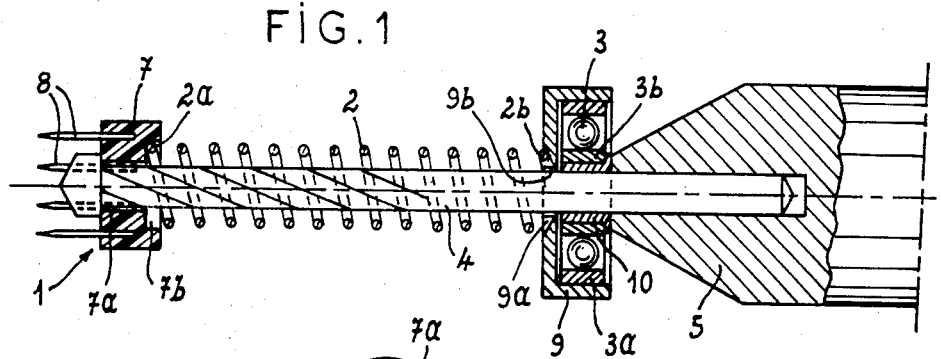
FIG. 1 is an axial cross-sectional view through the device of the instant invention with the chuck being shown highly diagrammatically and the drill bit also in diagrammatic form and in elevation.

The protective device of the invention comprises basically a protective head 1, a coil spring 2 and a bearing 3 which allows the protective head to remain stationary and affixed to the wall covering as the drill bit 4 is driven through the wall covering and the underlying wall upon its rotation by the chuck 5 at the end of a hand-held drill having an electric motor coupled to the chuck in the usual manner.

Figure 2:
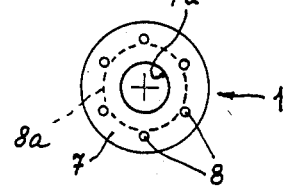
FIG. 2 is an end view of the pin-carrying face of the protective sleeve of FIG. 1.

The drill bit 4 can be of the masonry type and has a shank clamped in the chuck. The protective head 1 is formed by a cylindrical polyamide sleeve 7 formed with a central bore 7a of a diameter of about 0.1 mm greater than that of the drill bit 4 to be received thereon. From the left-hand face of the sleeve 7, six metallic points or pins 8 project, the shanks of these pins being molded and embedded in the sleeve 7. These pins are distributed in an angularly equispaced relationship about a circle 8a as represented in FIG. 2 and serve to penetrate the soft fibrous wall covering and thus to immobilize the fibers of the fabric and any backing material before the tip of the drill bit 4 begins its penetration.

The cylindrical sleeve 7 comprises a recess 7b within which one end 2a of the coil spring 2 is seated.

The latter is compressed between the sleeve 7 with advance of the drill bit 4 and a cylindrical member 9 which forms a casing in which is forcefitted the cylindrical outer race 3a of the ballbearing 3. The recess 9a in the casing 9 accommodates the outer end 2b of the spring 2.

The casing 9 has a central bore 9b of a diameter slightly greater than that of the shank of the tool bit to receive the latter with clearance.

The inner race 3b of the bearing 3 is fixed on the drill bit with the aid of an elastic sleeve 10 which can be of rubber or a synthetic resin (plastic) material.

During operation, the sleeve 7 is thrust against the wall covering, and the pins 8 pierce the latter in the region in which drilling is to be effected, the sleeve and the pins retaining the threads of the fabric against pulling. As the drilling pressure is applied, the spring 2 increases its pressure on the sleeve to retain it immobile against the wall covering during rotation of the bit in the entire drilling operation. Only upon retraction of the bit are the pins 8 withdrawn from the wall covering to leave it intact except for the hole which can have the diameter of the bit.

Figure 3:
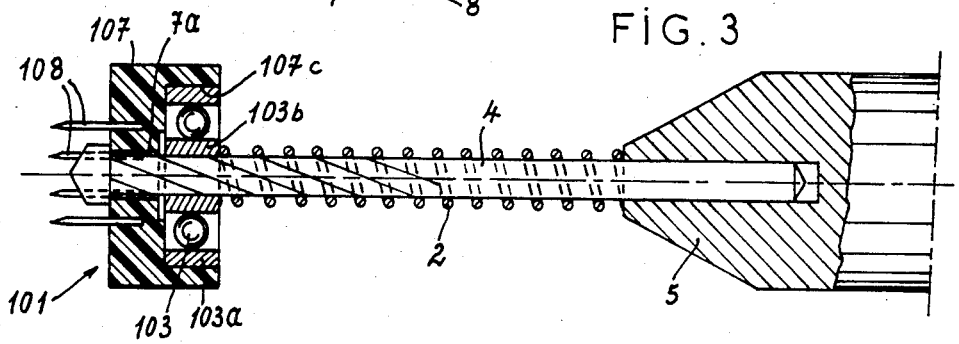
FIG. 3 is a view similar to FIG. 1 but illustrating another embodiment of the invention.

In the embodiment of FIG. 3, the spring 2 is able to rotate with the bit 4 and because the elements are functionally equivalent, similar reference numerals have been utilized where appropriate. In this embodiment, the sleeve 107 has been formed with a cylindrical recess 107c in which the bearing 103 is received. The outer race 103a is forcefitted into the recess 107c while the inner race 103b surrounds the drill bit 4 with a slight clearance and serves as a seat for the spring 2.

In this case, when the head 101 is pressed against the wall covering, the pins 108 pierce the latter and hold the sleeve 107 immobile while the drill bit 4 is advanced into the underlying wall. The spring 2 is here comprised between the chuck 5 and the inner race 103b of the bearing.

Figure 4:
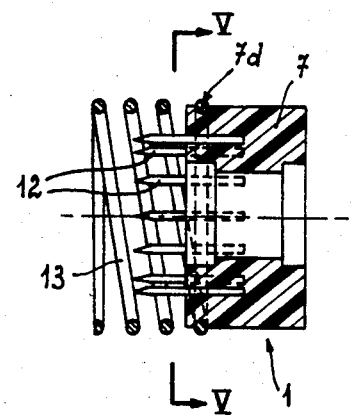
FIG. 4 is an axial section through the sleeve similar to that of FIG. 1 but drawn to a larger scale and provided with a supplemental spring.
Figure 5:
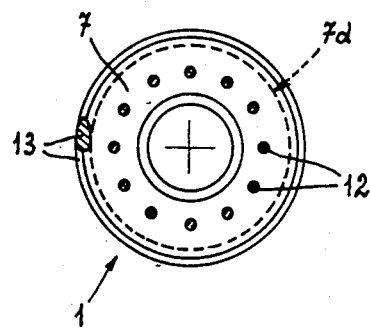
FIG. 5 is a sectional view taken along the line V—V of FIG. 4.

FIGS. 4 and 5 show still another embodiment of the invention where again similar reference numerals are utilized to represent similar structure.

Here, however, twelve pins 12 are anchored in the sleeve 7 and the latter is formed with a circumferential groove 7d close to the face of the sleeve confronting the wall covering and provided with the pins. In this groove 7d a supplemental spring 13 is lodged and can be a light-force spring adapted to be compressed as the pins 12 are thrust into the wall covering to anchor the sleeve against rotation. In this embodiment the pins 12 can be of smaller gauge than the pins 8 and the spring 13 serves to compress the fabric and its backing layer against the wall during the piercing operation and thus improve the penetration efficiency. The spring can also be lodged in a groove disposed between the outer periphery of the sleeve and the circles of pins 12.

The invention is, of course, not limited to the embodiments illustrated and described but also includes all modifications and variations within the spirit and scope of the appended claims utilizing equivalent structure. The protective head can have fewer points or pins or a greater number of pins. Means other than a ball bearing can be utilized to prevent rotation of the protective head. The device can be utilized on a tool with a handle or holder such as a ratchet drill or the like.

I claim:

1. A tool for use in interior decoration for the drilling of a hole in a support covered by a yieldable and tearable covering, the tool comprising:

a chuck member rotatable about an axis;

a solid drill bit received coaxially in said chuck member and adapted to bore axially forward into said support and having a front end remote from said chuck member for penetrating axially forward through said covering into said support when pressed axially forward thereagainst while rotating about the axis;

a covering-protective sleeve member closely surrounding said bit and having a front face turned away from said chuck member a multiplicity of pins projecting axially forward from said face and forming respective axially forwardly directed points distributed uniformly in at least one circle around said bit for piercing said covering, lodging in said support, and holding said sleeve member out of contact with said covering;

a coil spring surrounding said bit and braced axially between said sleeve member and said chuck member and enabling travel of said bit through said sleeve member with compression of said spring; and at least one bearing operatively connected between one of said members and said spring to enable rotation of said chuck member and said bit while permitting said sleeve member to be immobilized by said points upon engagement of said covering therewith.

2. The tool defined in claim 1 wherein said spring is braced at one end against said chuck member and at its opposite end against an inner race of said bearing, said sleeve being formed with a recess receiving said bearing, said bearing having an outer race fitted into said recess.

3. The tool defined in claim 1, further comprising a casing surrounding said bit proximal to said chuck member, said bearing being received in said casing, said spring being braced against said casing and against said sleeve member.

4. The tool defined in claim 3 wherein a supplementary spring is mounted on said sleeve member and surrounds said pins while yieldably extending in the direction of said pins for compression upon pressing of said sleeve member against said covering.

5. The tool defined in claim 2 wherein a supplementary spring is mounted on said sleeve member and surrounds said pins while yieldably extending in the direction of said pins for compression upon pressing of said sleeve member against said cover.

6. The tool defined in claim 4 wherein said sleeve member is provided with a circumferential groove, said supplementary spring being received in said groove.

7. The tool defined in claim 5 wherein said sleeve member is provided with a circumferential groove, said supplementary spring being received in said groove.

8. The tool defined in claim 1 wherein at least twelve such pins are provided in an equispaced relationship in a circle surrounding a bore traversed by said bit and extending centrally through said sleeve member.

9. The tool defined in claim 1 wherein said sleeve member is composed of a polyamide.

10. The tool defined in claim 1 wherein said sleeve member is provided with a central bore traversed by said bit and of a diameter substantially 0.1 mm greater than the diameter of said bit.

* * * * *